United States Patent [19]

Inoue

[11] 3,895,666

[45] July 22, 1975

[54] RADIAL PNEUMATIC TIRE

[75] Inventor: Teruo Inoue, Yao, Japan

[73] Assignee: The Toyo Rubber Industry Co., Ltd., Osaka, Japan

[22] Filed: Dec. 26, 1973

[21] Appl. No.: 427,615

[30] Foreign Application Priority Data

Dec. 26, 1972 Japan.............................. 48-2466
Dec. 26, 1972 Japan.............................. 48-2467

[52] U.S. Cl......... 152/362 R; 152/355; 152/362 CS; 152/374
[51] Int. Cl........................... B60c 15/06; B60c 9/02
[58] Field of Search.. 152/354, 355, 361 PP, 362 R, 152/362 CS, 374

[56] References Cited

UNITED STATES PATENTS

| | | | |
|---|---|---|---|
| 3,301,302 | 1/1967 | Wild et al. ........................ | 152/354 |
| 3,392,773 | 7/1968 | Warren et al. ................... | 152/362 R |
| 3,631,913 | 1/1972 | Boileau ........................... | 152/362 R |
| 3,736,974 | 6/1973 | LeJeune ........................... | 152/362 R |

Primary Examiner—Drayton E. Hoffman
Attorney, Agent, or Firm—Sughrue, Rothwell, Mion, Zinn & Macpeak

[57] ABSTRACT

In radial ply pneumatic tires having more than one ply of carcass cords, improvements are attained by a bead construction in which: a reinforcing ply of inorganic fiber cords is disposed in the bead area and the lower sidewall area adjacent thereto radially outwardly of the carcass plies and a terminal edge of the carcass plies, a terminal edge of the reinforcing ply or terminal edges of both the carcass plies and the reinforcing ply are embedded with a covering ply of a textile fabric coated with an elastomeric compound so as to be wrapped in it, whereby durability in the bead area and the vicinity of the bead area is enhanced. Where the carcass ply comprises cords of an inorganic fiber, at least one terminal edge of the carcass or reinforcing ply is enveloped, whereas where the carcass ply comprises cords of an organic fiber, the reinforcing ply is made of steel cords and the terminal edge of the reinforcing ply is enveloped.

9 Claims, 12 Drawing Figures

RADIAL PNEUMATIC TIRE

BACKGROUND OF THE INVENTION

1. Field of the Invention

This invention relates to improvements in pneumatic tires of a radial ply type (hereinafter simply referred to as radial ply tires), and specifically, to improvements in the durability of radial ply tires, notably in the bead area and in the vicinity of the bead area.

2. Description of the Prior Art

In general, radial ply tires have a lower rigidity (stiffness) and undergo a greater amount of flexing under a load imposed upon them, as compared with the so-called bias tires, so that all areas of radial ply tires are subjected to greater deflection. Particularly, a greater tendency of failure in the bead area and its vicinity and the shoulder area of the tire arises, since both of these areas undergo a greater deflection than the deflections of the other areas as a result of the load.

In order to avoid this drawback various countermeasures have hitherto been proposed for improving the bead construction, for example, inserting a reinforcing ply of cords or a strip made of a rigid rubber compound in the bead area. However, increasing rigidity in the bead area and its vicinity for the purpose of decreasing the flexing added thereto tends to induce a failure in the border region between the sidewall area which is thin and flexible, and the bead area which is rigid.

This invention has been, therefore, accomplished in view of the defect described above by improving the construction of the border region between the bead area and the sidewall area, that is to say the construction of the lower sidewall area, as well as increasing the rigidity in the bead area.

Therefore, it is a principal object of this invention to provide, in radial ply tires, improved constructions of the bead area and its vicinity, resulting in an increased durability thereof.

These and other objects and advantageous features of the invention will hereinafter more fully appear.

SUMMARY OF THE INVENTION

In accordance with the invention, in radial ply tires having at least one ply of carcass cords which extend nearly in the radial direction from the annular beads at both the ends radially inward of the tire, a reinforcing ply of inorganic fiber cords is disposed in the bead area and the lower sidewall area adjacent the bead area radially outwardly of the carcass plies of cords and further, a covering ply of a textile fabric coated with an elastomeric compound is embedded so as to be wrapped around a terminal edge of the reinforcing ply, a terminal edge of the carcass plies, or both the terminal edge of the reinforcing ply and the terminal edge of the carcass plies.

In one preferred embodiment of the invention, the carcass ply comprises textile cords of organic fibers such as rayon, nylon, polyester or the like, the reinforcing ply comprises steel cords, and only the terminal edge of the reinforcing ply is embedded with a covering ply of a textile fabric coated with an elastomeric compound so as to be wrapped in it. This first embodiment of the invention will be described in greater detail, by way of example, hereinafter with reference to the accompanying FIGS. 1 to 7.

In accordance with an alternative preferred embodiment of this invention, the carcass plies and the reinforcing ply each comprises inorganic fiber cords such as steel cords, glass fiber cords or the like, and the terminal edge of the carcass plies or the terminal edge of the reinforcing ply or both the terminal edge of the carcass plies and the terminal edge of the reinforcing ply is embedded with a covering ply of a textile fabric coated with an elastomeric compound. The second embodiment of this invention will be described in greater detail, by way of example, hereinafter with referrence to the accompanying FIGS. 8 to 12.

BRIEF DESCRIPTION OF THE ACCOMPANYING DRAWINGS

The embodiments of this invention are described by way of example by reference to the accompanying drawings, with FIGS. 1 to 7 relating to one embodiment of the invention and FIGS. 8 to 12 relating to another embodiment of the invention.

DETAILED DESCRIPTION OF PREFERRED EMBODIMENTS OF THE INVENTION

Figure 1:
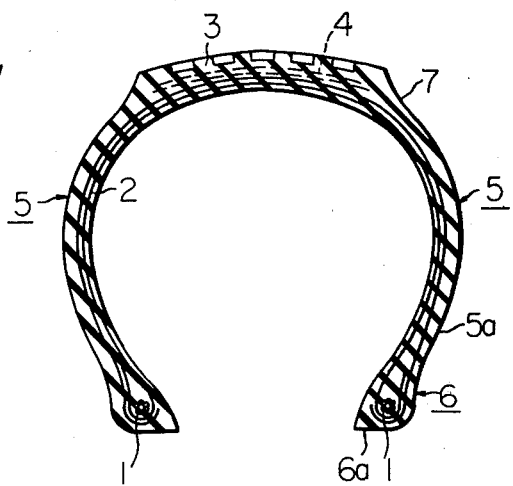
FIG. 1 is a radial sectional view showing one example of a conventional radial ply tire.

In FIG. 1, the radial ply tire of a conventional construction comprises annular beads 1 at both ends radially inward of the tire, plies of carcass cords 2 extending nearly in a radial direction of the tire from the annular beads, a tread 3 on the circumferential plane of the tire plies of breaker cords 4 (belt plies) located under the tread which plies serve to restrict extension in a circumferential direction, a pair of sidewalls 5 extending from a bead region to the tread portion, in which the reference numeral 5a represents a lower sidewall area, a bead area 6 having a bead base 6a and a shoulder area 7.

Figure 2:
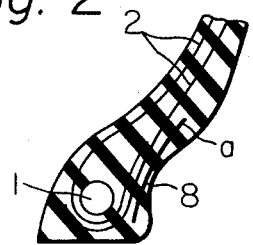
FIG. 2 is a partial sectional view showing the bead area and the lower sidewall area, in a conventional radial ply tire having the construction of FIG. 1 where the bead area of the carcass plies is reinforced.

Referring to FIG. 2, the bead area 6 and the lower sidewall area 5a of the carcass plies are strengthened by a reinforcing ply of steel cords 8 in order to enhance the rigidity in the bead area and its vicinity, and this conventional method is often used. According to this construction, the rigidity of the sidewalls varies remarkably, particularly in a part of the terminal edge a of the steel cords having a high modulus of elasticity as a reinforcing ply where the stress is concentrated, so that failure of the tire frequently occurs, for example, a separation between the steel cords in the terminal edge a and the rubber compound around them or a cracking from the part of the terminal edge a toward its surrounding rubber compound. This tendency is remarkable with a tire which is used under high load. Thus, in order to remedy this defect it is necessary to choose a suitable strip of material such as nylon, rayon, polyester or the like which is capable of dispersing or avoiding effectively a concentration of the stress at the terminal edge of the steel cords and furthermore, is capable of preventing mechanical degradation (ageing) of the rubber compound in the part of the terminal edge a for a long period of time and of retaining the mechanical ageing of the rubber compound, if any, occurs in the locality of the terminal edge a and from extending into other areas. Regardless of the rubber compounds of various characteristics which may be used as a strip of material described above, such a strip has been substantially ineffective in dispersing the stress and preventing the extending of mechanical ageing.

Figure 3:
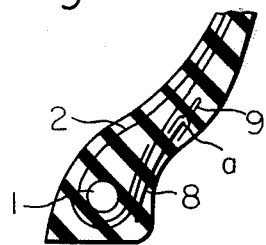
FIG. 3 is a partial sectional view of a radial ply tire in accordance with one embodiment of this invention showing one example in which the bead area and the lower sidewall area are illustrated.

According to this invention, however, excellent effects are achieved by a construction as shown in FIG. 3 as a result of much research for a strip of material having the necessary characteristics and properties as described above. FIGS. 3, 5, 6 and 7 show examples of constructions according to this embodiment of the invention.

Figure 4:
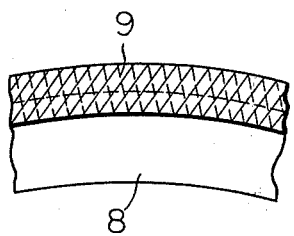
FIG. 4 is a partial enlargement showing an angular arrangement in which the covering ply of a textile fabric is oriented to the reinforcing ply in FIG. 3.

In FIG. 3, a covering ply 9 of a textile fabric coated with an elastomeric compound is wrapped around the terminal edge a of the reinforcing ply of steel cords 8 so that it folds around the terminal edge a, thereby preventing an abrupt change in the rigidity of the terminal edge a and preventing a concentration of stress on the terminal edge. Here, a tire cord fabric of nylon cords is employed for the covering ply. It is further preferred to dispose the nylon cords at an oblique angle within a range of from 30° to 70° in a radial direction as shown in FIG. 4 in order to further decrease the stress created at the terminal edge by deflection which is caused in a circumferential direction of the tire under load. In this case, it is preferred to dispose the steel cords (a reinforcing ply) at an angle in a range of from 45° to 75° in a radial direction.

Figure 5:
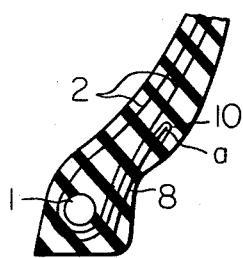
FIGS. 5, 6 and 7 are each a partial sectional view of a radial ply tire according to this invention similar to FIG. 3 showing another example in which the bead area and the lower sidewall area are illustrated.

FIG. 5 similarly illustrates a covering ply 10 of a textile fabric in a different form from that employed for the same purpose as the fabric 9 of FIG. 3.

Figure 6:
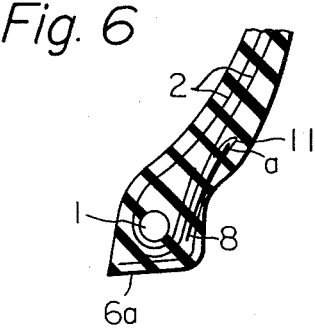

Referring to FIG. 6, the bead area and its vicinity are constructed in such a manner that a covering ply 11 of a textile fabric not only is wrapped around the terminal edge, but also envelops the side of the reinforcing ply 8 around the inward terminal edge up to the bead base 6a thus serving also as a chafer ply, further in order to avoid chafing of the bead area against a tire rim during running, as an improvement over the example of FIG. 5.

Figure 7:
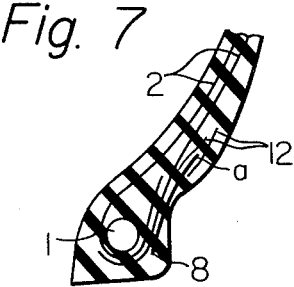

Furthermore, FIG. 7 shows another example using a covering ply 12 of a textile fabric of two separate divided strips with one strip being placed radially inward of the terminal edge and other strip being placed radially outward of the terminal edge.

In these examples, as shown in FIGS. 3, 5, 6 and 7, it is possible to use any type of cord fabrics (e.g., any tire cord fabric) or woven fabrics made of organic fibers such as nylon, rayon, polyester or the like as the textile fabric of the covering ply. This aforedescribed embodiment according to the invention has been with reference to the use of two plies of carcass cords made of polyester, but the number of plies and the type of the carcass cords can be suitably varied depending upon the tire size, and the service conditions and is not restricted to this specific case.

In order to demonstrate the advantages of this embodiment of the invention test results were obtained on test drums with the tires according to this embodiment and the results obtained are shown below.

| Test Conditions | |
| --- | --- |
| Tire Size | 10.00 – 20, 14 PR |
| Load | JIS (Japanese Industrial Standards) (D) × 180% |
| Speed | 60 Km/h. |
| Running Distance | 10,000 Km |

Table 1

| Figure Showing Tire Construction | Magnitude of Separation of the Terminal Edge (a) (mm) |
| --- | --- |
| FIG. 2 (conventional) | 7 – 10 |
| FIG. 5 | 0 – 0.5 |
| FIG. 7 | 0 – 1.5 |

As will be obvious from the results contained in the table above, the tires constructed according to this invention (FIGS. 5 and 7) exhibit a good durability against separation at the bead area.

Figure 8:
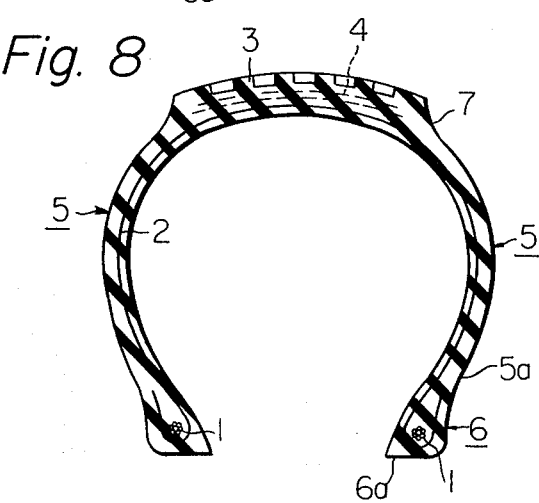
FIG. 8 is a radial sectional view of another example of a conventional radial ply tire similar to FIG. 1.

To describe a second embodiment of this invention, reference is made to FIG. 8 which shows another example of a radial ply tire having a conventional construction. In FIG. 8, the reference numerals, 1, 2, 3, 4, 5, 5a, 6, 6a, and 7 have the same meanings as those discussed with reference to FIG. 1 above, except that the carcass ply comprises an inorganic fiber cords such as glass fiber cords, steel cords or the like.

Figure 9:
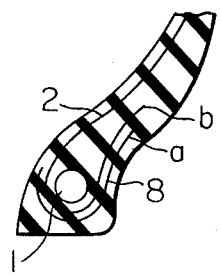
FIG. 9 is a partial sectional view showing the bead area and the lower sidewall area, in a conventional radial ply tire having the construction of FIG. 8 where the bead area of the carcass plies is reinforced.

According to the conventional construction of a radial ply tire as shown in FIG. 9, in which the bead area and the lower sidewall area of the carcass plies 2 is made of inorganic fiber cords, and are reinforced with a reinforcing ply 8 of inorganic fiber cords (e.g., steel cords or glass cords), similar difficulties or inconveniences are encountered to those in the tire of FIG. 2, that is to say, the terminal edge a of the reinforcing ply 8 made of inorganic fiber cords or the terminal edge b of the carcass plies 2 of inorganic fiber cords creates an abrupt change in rigidity of the sidewalls, resulting in a concentration of the stress thereon, which leads to various tire failures. Particularly when the tire is used under high load a separation between the terminal edge a or b and its surrounding rubber compound occurs or a cracking of the terminal edge from its peripheral rubber compound takes place.

Figure 10:
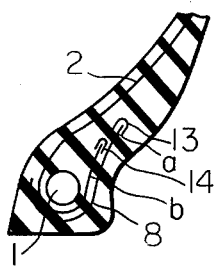
FIG. 10 is a partial sectional view of a radial ply tire having the construction of FIG. 8 but utilizing another embodiment of this invention and shows one example where the bead area and the lower sidewall area are illustrated.

According to a second embodiment of this invention, one example of a construction overcoming the drawback referred to above in the bead area is shown in FIG. 10 in which steel cords are used as the carcass plies 2 and likewise, steel cords are used as the reinforcing ply 8, and the terminal edge b of the former and the terminal edge a of the latter are wrapped, respectively, in covering plies of textile fabrics such as those of nylon, rayon, polyester or the like, 13 and 14, each of which are coated with an elastomeric compound. Here, a tire cord fabric of nylon cords is employed for the textile fabric of the covering ply. Preferably, the covering ply of the nylon cord fabric is disposed at an oblique angle ranging from 30° to 70° in a radial direction whereas the reinforcing ply of steel cords is disposed at an angle ranging from 45° to 75° in a radial direction, for the purpose of further decreasing the stress created in the terminal edges due to deflection caused in a circumferential direction of the tire under load, as shown in FIG. 4.

Figure 11:
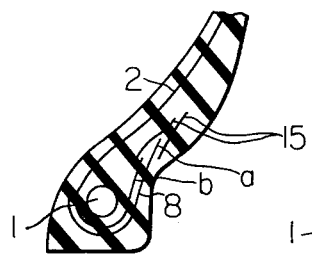
FIGS. 11 and 12 are each a partial sectional view of a radial ply tire according to this invention, similar to FIG. 10 showing another example of this embodiment of the invention in which the bead area and the lower sidewall area are illustrated.

FIG. 11 is similar to FIG. 10, and shows another example in which both the terminal edges, a and b are enveloped with two separate, divided strips of a covering ply 15 of a textile fabric and arranged between the two strips, instead of being wrapped separately in the two strips as shown in FIG. 10.

Figure 12:
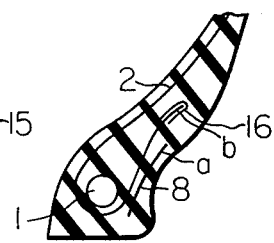

FIG. 12 represents an additional example where the terminal edge b of the carcass plies 2 is located higher than the terminal edge a of the reinforcing ply 8, with only the terminal edge b being wrapped in a covering ply 16 of a textile fabric. Here, it is also possible to envelop both the terminal edges a and b in the covering ply.

In the description above, a textile fabric of the covering ply (exemplified by 13, 14, 15, 16) is intended to designate cord fabrics or woven fabrics made of any type of organic fibers such as nylon, rayon, polyester or the like.

The above embodiment has been described with reference to the use of one ply of carcass cords for the sake of simplicity, but this embodiment is not limited to such use. Similarly, more than two plies of carcass cords can be used.

In order to demonstrate the advantageous properties and characteristics of tires having in accordance with this embodiments test results were obtained on test drums with tires according to this second embodiment of this invention and are given below.

| Test Conditions | |
| --- | --- |
| Tire Size | 10.00 – 20, 14 PR |
| Load | JIS (Japanese Industrial Standards) (D) × 180% |
| Speed | 60 Km/h. |
| Running Distance | 10,000 Km |

Table 2

| Figure Showing Construction | Magnitude of Separation of the Terminal Edge (a) or (b) (mm) |
| --- | --- |
| FIG. 9 | 8 – 15 |
| FIG. 10 | 0 – 0.8 |
| FIG. 12 | 0 – 2.0 |

Thus, it will be evident from the results set forth above that tires according to this embodiment of the invention also have good durability in the bead area.

While the invention has been described with reference to specific embodiments thereof, it will be readily apparent that modifications or variations can be made in the invention without departing from the spirit and scope of the invention.

What is claimed is:

1. In a pneumatic tire of the radial type having at least one ply of carcass cords extending from annular beads at both ends radially inward of the tire in a nearly radial direction, the improvement wherein: said carcass cords comprise an organic fiber, and wherein a reinforcing ply of steel cords is disposed in the bead area and a lower sidewall area adjacent said bead area and radially outwardly of said carcass cord plies, a terminal edge of said reinforcing ply being embedded with and wrapped by a covering ply of a textile fabric coated with an elastomeric compound, and wherein said reinforcing ply is disposed at an angle ranging from 45° to 75° with respect to the radial direction of said tire and said covering ply is disposed at an angle ranging from 30° to 70° to the radial direction.

2. The radial ply pneumatic tire of claim 1, wherein said carcass cord ply comprises polyester cord fabric and said covering ply comprises nylon cord fabric.

3. The radial ply pneumatic tire of claim 1, wherein said terminal edge of said reinforcing ply is embedded and enveloped with said covering ply folded around said terminal edge.

4. The radial ply pneumatic tire of claim 1, wherein said terminal edge of said reinforcing ply is embedded and enveloped with said covering ply, said covering ply extending from the side of said reinforcing ply up to the bead base.

5. The radial ply pneumatic tire of claim 1, wherein said covering ply comprises two separate strips and said terminal edge of said reinforcing ply is embedded and enveloped by said covering ply strips, with one strip of said covering ply being placed radially inward of said terminal edge and the other strip being placed radially outward of said terminal edge.

6. In a pneumatic tire of the radial type having at least one ply of carcass cords extending from annular beads at both ends radially inward of the tire in a nearly radial direction, the improvement wehrein: said carcass cords are formed of an inorganic fiber, and wherein a reinforcing ply of inorganic fiber cords is disposed in the bead area and a lower sidewall area adjacent said bead area and radially outward of said carcass cord plies, and at least one terminal edge of said carcass cord plies and a terminal edge of said reinforcing ply are embedded with and wrapped by a covering ply of a textile fabric coated with an elastomeric compound, and wherein said reinforcing ply is disposed at an angle ranging from 45° to 75° with respect to the radial direction of the tire, and said covering ply is at least at an angle ranging from 30° to 70° with respect to said tire radial direction.

7. The radial ply pneumatic tire of claim 6, wherein said carcass ply cords and said reinforcing ply cords are steel cords, and said covering ply comprises nylon cord fabric.

8. The radial ply pneumatic tire of claim 6, wherein at least one terminal edge of said reinforcing ply and said terminal edge of said carcass ply is embedded and enveloped by said covering ply which is folded about said terminal edges.

9. The radial ply pneumatic tire of claim 6, wherein said covering ply comprises two separate strips and both of said terminal edges are embedded and enveloped by said covering ply strips so that said terminal edges are disposed between said strips.

* * * * *